United States Patent [19]
Cote

[11] 3,993,321
[45] Nov. 23, 1976

[54] BICYCLE HITCH

[76] Inventor: René Côté, 6999a Christophe-Colomb St., Montreal, Quebec, Canada

[22] Filed: Aug. 25, 1975

[21] Appl. No.: 607,826

[52] U.S. Cl. ............................................. 280/204
[51] Int. Cl.² ......................................... B62J 39/00
[58] Field of Search .......... 280/204, 292, 293, 511, 280/152.1

[56] References Cited
UNITED STATES PATENTS

| | | | |
|---|---|---|---|
| 359,127 | 3/1887 | Brusie | 280/293 |
| 2,629,611 | 2/1953 | Covington | 280/292 |
| 3,598,426 | 8/1971 | Spiese | 280/204 |

FOREIGN PATENTS OR APPLICATIONS

| | | | |
|---|---|---|---|
| 877,165 | 9/1942 | France | 280/204 |
| 629,785 | 5/1936 | Germany | 280/204 |
| 268,349 | 8/1927 | United Kingdom | 280/204 |

*Primary Examiner*—Kenneth H. Betts

[57] ABSTRACT

An attachment for a bicycle serving as a hitch for towing a small trailer or coaster. The bicycle hitch can be attached to any standard bicycle without modifying the same and is adjustable to suit bicycles of various wheel diameters. The bicycle hitch includes a curved tubular member subtending substantially a quarter circle, adapted to spacedly surround the top back quarter portion of the rear driving wheel of a bicycle in the plane of said rear wheel and substantially coaxial therewith. This curved member is adjustably attached to the bicycle frame or to the seat support rod at its front end, while its rear end carries a standard ball member for hitching purposes. The curved member is further secured to the rear wheel axle of the bicycle by means of a pair of U-shaped fork members having a series of apertures at the outer ends of their legs to adjustably receive the protruding ends of the bicycle wheel rear axle, while the bight portion of each fork member is provided with a clamping member adjustably securable to the curved member along the length of the latter.

9 Claims, 3 Drawing Figures

U.S. Patent   Nov. 23, 1976   3,993,321
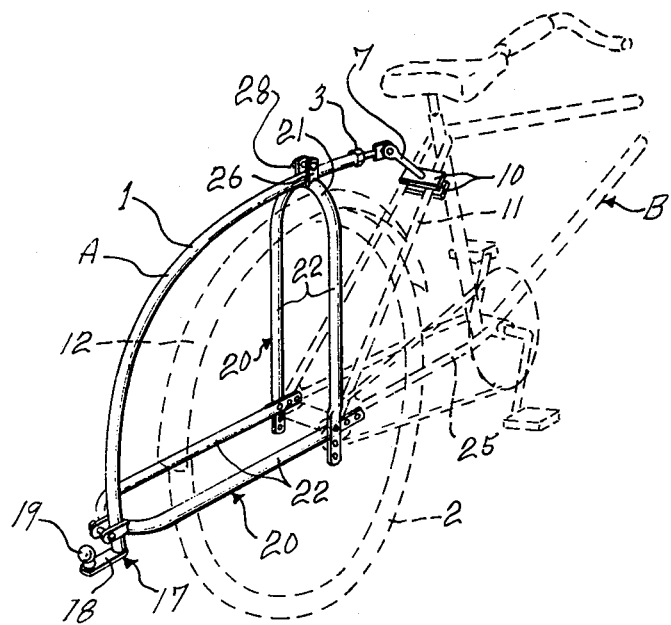
Fig-1
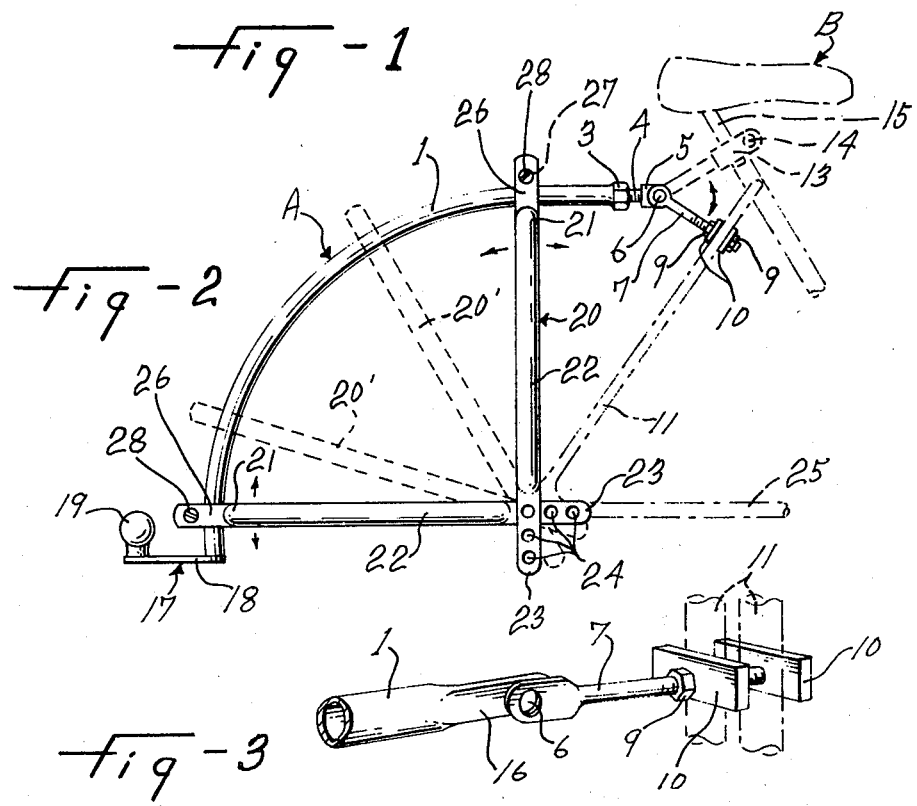
Fig-2
Fig-3

BICYCLE HITCH

The present invention relates to a bicycle attachment and, more particularly, to such an attachment used as a hitch for hitching to the bicycle a small trailer, a coaster or the like, used, for instance, by delivery boys working for groceries or for newspapers delivery boys, or for the carrying of camping equipment by campers riding on bicycles.

Objects of the present invention are to provide a bicycle hitch of the character described, which is of simple and inexpensive construction; which is sturdy; which can be firmly attached to the bicycle; and which incorporates a plurality of adjustments to fit bicycles having different wheel diameters and also bicycles having frames of different shapes and sizes.

The foregoing and other objects of the invention will become more apparent during the following disclosure and by referring to the drawings, in which:

FIG. 1 is a perspective view of the bicycle hitch of the present invention fitted to a standard bicycle shown in dotted lines;

FIG. 2 is a side elevation of the bicycle hitch in relation with the bicycle shown in dot-and-dash lines and also showing in dotted line another position of each of the fork members forming part of the hitch; and FIG. 3 is a partial perspective view of a modified arrangement of the clamping member at the front end of the curved member of the bicycle hitch.

In the drawings, like reference characters indicate like elements throughout.

The bicycle hitch in accordance with the invention is generally indicated at A and is adapted to fit any standard bicycle B, whether it is pedal-operated, as shown, or motor-operated.

The hitch of the invention includes an elongated curved member 1, preferably of tubular and steel construction. This curved member 1 subtends in its main portion substantially a quarter of circle and lies in a flat plane and is adapted to be disposed in the plane of the rear wheel 2 of the bicycle substantially coaxial therewith and such as to surround the top back quarter portion of said rear wheel 2.

A nut 3 is welded, or otherwise secured, to the front end of the curved member 1 in alignment therewith and a bolt 4 is adjustably screwed within the nut 3, being in alignment with the terminal front portion of the curved member 1. The head 5 of bolt 4 carries a transverse pivot pin 6 serving as a pivot for a link 7 which thus can pivot in the plane of the curved member 1. Link 7 has a threaded terminal end on which are screwed two nuts 9 with the interposition of two centrally apertured clamping plates 10 fitted on the threaded portion of link 7.

The clamping plates 10 are adapted to receive therebetween the legs 11 of the auxiliary downwardly rearwardly inclined rear wheel fork of the bicycle frame. The legs 11 extend on each side of the link 7. The clamping plates are pressed against said legs by screwing the nuts 9. Pivot pin 6 allows for the variable inclinations of the legs 11 with different bicycle makes or sizes. The adjustable curved member extension provided by bolt 4 allows further adjustment of the clamping plates on legs 11, depending on the location of the anchor of the normal mud guard 12 of the bicycle which is thus allowed to remain in position.

As a modification, the clamping plates 10 with their nuts 9 are simply replaced by a split collar 13 with a transverse tightening nut 14 threaded on the link 7 and adapted to fit around and be clamped on the bicycle seat support rod 15, as shown in FIG. 2.

A further modification is shown in FIG. 3, wherein the adjustable extension of the curved member 1 is eliminated by replacing the nut 3 and the bolt 4 of the embodiment of FIG. 2 by the system of FIG. 3 wherein the front terminal portion of the curved member 1' is simply flattened, as shown at 16 and provided with a transverse hole in which pivot pin 6 is fitted, serving as pivot for the link 7. This is a simplified, less expensive embodiment which still allows the bicycle hitch to be fitted to most of the existing types and makes of bicycles.

The rear end of the curved member 1 carries a hitching means, generally indicated at 17. This hitching means may simply consist of a plate 18 secured to the end of the curved member 1 extending substantially horizontally outwardly from the curved member and carrying at its outer end an upstanding standard sphere or ball 19, of steel construction and of standardized diameter, for receiving a standard coupling member, not shown, carried by the front end of a trailer, or coaster, to be hauled by the bicycle.

The curved member 1 is further secured in position on the bicycle frame by means of a pair of substantially similar fork members 20. Each fork member is preferably of tubular construction and has a U-shape. It includes a curved bight member 21 and a pair of straight legs 22. The free end portions of the legs 22 are flattened, as shown at 23, and provided with a series of longitudinally spaced holes 24; for instance, three such holes in each leg. The holes of both legs are aligned in pairs; the holes of each pair are adapted to receive the protruding threaded terminal portions of the rear wheel axle of the bicycle and tightened in place by the standard nuts used to secure the rear wheel axle to the bicycle frame forks 11 and 25. Thus, the holes 24 serve as means for the removable connection of the fork members 20 to a fixed part of the bicycle.

The bight 21 of each fork 20 is provided with a pair of outwardly protruding ears 26 parallel to each other and disposed transversely to the plane of the fork member, the outer end of said ears having registering holes 27 for receiving a bolt and nut assembly, indicated at 28, for tightening the ears against the curved member 1 inserted between the ears 26 and between the bight portion 21 and the bolt of assembly 28. Thus, this arrangement forms a means to secure each fork to the curved member in an adjustable manner along any point of the curved member, as clearly indicated by the inclined positions shown in dotted lines at 20', which may be taken by the fork members 20.

The terminal flattened portions 23 of the legs of the two forks cross each other at their connection with the rear wheel axle and, preferably, the holes in the same position on the fork legs are in register to receive the ends of the rear wheel axle.

In the embodiment shown, there are three pairs of holes for each fork, the first pair of holes, namely nearest the outer end of the legs of the forks, are used to suit bicycle wheel diameters varying between 28 inches and 30 inches. The central pair of holes will suit wheel diameters of between 26 inches and 28 inches and the remaining pair of holes farthest from the ends of the fork legs will suit diameters varying between 24 inches and 26 inches. Thus, the same bicycle hitch can fit wheel diameters varying between 24 inches and 30 inches.

Obviously, by increasing the number of holes, it is possible for the same bicycle hitch to fit bicycles having a still greater variation in wheel diameter. For each adjustment, the connection between the fork and the curved member is adjusted along the curved member as previously noted, so as to preferably always maintain the rearwardly directed fork member substantially horizontally, while the upwardly directed fork member can be positioned either at the vertical or at any suitable inclination, in accordance with the desire of the bicycle rider.

Obviously, the fork members 20 could be arranged to be secured at their outer ends to a luggage platform, or the like, which are fitted to certain bicycles or motor-operated bicycles, without having to secure said fork members to the rear wheel axle.

What I claim is:

1. A bicycle hitch comprising a curved member subtending substantially a quarter circle and adapted to spacedly surround the top back quarter portion of the rear wheel of a bicycle in the plane of said rear wheel and substantially coaxial therewith, means at the front end of said curved member to removably secure said curved member to a fixed part of a bicycle, hitching means carried by the other end of said member to detachably cooperate with the hitching means of a trailer or the like, a pair of U-shaped fork members to support longitudinally spaced points of said curved member, attaching means carried by the bight portion of said fork members to secure the latter to said curved member, said fork members having legs radially inwardly extending from said curved member, the free end portions of said legs having means for removable connection with another fixed part of said bicycle said attaching means including a clamping member carried by the bight of each fork member and clampable at any point along the length of said curved member to adjustably vary the attachment of said fork members longitudinally of said curved member.

2. A bicycle hitch as claimed in claim 1, wherein the ends connecting means at the outer end portions of said legs includes means to adjustably vary longitudinally of the respective legs the connection points of said legs to said other fixed part of said bicycle.

3. A bicycle hitch as claimed in claim 1, wherein said clamping member includes a pair of ears upstanding from said bight and between which said curved member is inserted and bolt and nut means engaging said ears and tightening the same against said curved member.

4. A bicycle hitch as claimed in claim 1, wherein said means at the front end of said curved member, to removably secure said member to a fixed part of a bicycle, includes a link pivotally connected at one end to said front end of said curved member for movement in the plane of said curved member and a clamping member carried by the other end of said link and clampable to said fixed part of said bicycle.

5. A bicycle hitch as claimed in claim 4, wherein a bolt is screwed within the front end of said curved member in alignment therewith and said link is pivoted to the head of said bolt to adjust the effective length of said curved member.

6. A bicycle hitch comprising a curved member subtending substantially a quarter circle and adapted to spacedly surround the top back quarter portion of the rear wheel of a bicycle in the plane of said rear wheel and substantially coaxial therewith, means at the front end of said curved member to removably secure said curved member to a fixed part of a bicycle, hitching means carried by the other end of said member to detachably cooperate with the hitching means of a trailer or the like, a pair of U-shaped fork members to support longitudinally spaced points of said curved member, attaching means carried by the bight portion of said fork members to secure the latter to said curved member, said fork members having legs radially inwardly extending from said curved member, the free end portions of said legs having means for removable connection with another fixed part of said bicycle, and wherein said means at the front end of said curved member, to removably secure said member to a fixed part of a bicycle, includes a link pivotally connected at one end to said front end of said curved member for movement in the plane of said curved member and a clamping member carried by the other end of said link and clampable to said fixed part of said bicycle.

7. A bicycle hitch as claimed in claim 6, wherein said clamping member includes a split collar adapted to surround the seat support rod of said bicycle.

8. A bicycle hitch as claimed in claim 6, wherein said clamping member includes a pair of centrally apertured clamping plates fitted on the ends of said link, said link being threaded and further including nuts engaging said plates and screwed on said threaded link portion to tighten said plates toward each other against a pair of bicycle frame tubes extending between each plate and on each side of the link.

9. A bicycle hitch as claimed in claim 6, wherein a bolt is screwed within the front end of said curved member in alignment therewith and said link is pivoted to the head of said bolt to adjust the effective length of said curved member.

* * * * *